3,055,840
RUTHENIUM-CONTAINING CATALYSTS AND METHODS OF MAKING SAID CATALYSTS AND INCREASING THEIR ACTIVITY

John H. Koch, Jr., Nutley, N.J., assignor, by mesne assignments, to Engelhard Industries, Inc., Newark, N.J., a corporation of Delaware
No Drawing. Filed Jan. 13, 1958, Ser. No. 708,371
14 Claims. (Cl. 252—443)

This invention relates to a ruthenium-containing catalyst which is particularly efficacious for the reduction of aldehydes and ketones.

Ruthenium catalysts on various carriers have been described heretofore. These catalysts have a specific property of hydrogenating ketone and aldehyde groups under low temperature conditions, a property which is highly important where labile organic compounds are concerned. The ruthenium-containing catalysts are superior to all others in this specific hydrogenating activity; however, ruthenium catalysts have the deficiency of instability of activity for low temperature, atmospheric pressure reactions, and this is particularly true of ruthenium supported on carbon powder, which is the most active catalyst for acetone hydrogenation at room temperature conditions. The loss of activity is erratic and only a partial recovery of activity may be obtained by again reducing the catalyst.

For example, a catalyst consisting of 5 percent by weight of elemental ruthenium, supported on wood charcoal, hydrogenated acetone at the rapid rate of 98 ml. of hydrogen taken up in a period of five minutes, when 100 mg. of catalyst were shaken with 1 ml. of acetone and 100 ml. of distilled water. After a period of 6 months, the catalyst was retested, using the same procedure, and was found to be substantially without activity. This loss of activity is objectionable since there is no way to guarantee that a manufactured catalyst will have any activity at all by the time it is ready for use by a prospective customer.

Ruthenium catalyst promoted with one or more metals, when properly prepared, have two important advantages over catalysts consisting of elemental ruthenium alone supported on a carrier, in the hydrogenation of ketones and aldehydes. First of all, the initial activity of the catalyst is greater, the activity being as much as 100 percent more than a catalyst having the same total metal content in the form of elemental ruthenium, and second, the activity stability for ruthenium catalysts promoted with one or more other metals is satisfactory in all respects.

Additional advantages of ruthenium combination catalysts apply to particular reactions. For example, a catalyst consisting of 1 percent by weight of elemental ruthenium and 4 percent by weight of elemental palladium, supported on a carbon carrier, performs the ruthenium function of hydrogenating dextrose to sorbitol with high selectivity, while a 5 percent palladium on carbon catalyst is inactive for this reaction, and a 5 percent ruthenium on carbon catalyst produces a disproportionate quantity of undesired by-products.

The use of ruthenium combination catalysts is valuable not only as an improvement over elemental ruthenium for the ruthenium functions of hydrogenating ketones and aldehydes, but an additional improvement is obtained in the poisoning resistance of platinum group metal catalysts. For example, a 0.6 percent by weight platinum on carbon or alumina catalyst is active for the hydrogenation of benzene rings, such as the hydrogenation of toluene at atmospheric pressure and at temperatures in the range of 150 to 250° C. Such catalysts, however, are rapidly poisoned by the thiophenes normally present in toluene. A catalyst consisting of 0.4 percent by weight ruthenium metal and 0.2 percent by weight platinum metal supported on carbon or alumina, has a greatly improved poisoning resistance in this reaction so that, although the initial activity of this catalyst is slightly less, the useful catalyst life is greatly extended.

The ruthenium content of the novel catalyst of this invention may be, for example, elemental ruthenium or oxides thereof, such as the sesquioxide, dioxide and tetroxide, or salts of ruthenium such as barium perruthenite, sodium perruthenite, and the like; ruthenates such as magnesium, strontium, calcium, silver, barium, potassium and sodium ruthenates; perruthenates, such as sodium and potassium perruthenates, and the like; ruthenium halides such as ruthenium dichloride, ruthenium trichloride, ruthenium tetrachloride, ruthenium pentafluoride, and the like; ruthenium sulfides such as ruthenium disulfide; and chloro salts of ruthenium such as potassium chloro perruthenate. Of these catalytic components, elemental ruthenium and ruthenium oxides are preferred due to the unusual efficacy which they possess as catalysts in the reduction of aldehyde and ketone groups.

The ruthenium metal of the catalyst is promoted by another platinum group metal and, more particularly, platinum, palladium or rhodium, the ruthenium content of the catalyst constituting about 20 to 95 percent by weight of the catalytically active metal content of the catalyst.

The catalyst supports which may be used in the catalyst of the invention are, for example, carbon, alumina, including activated alumina, silica, including kieselguhr and synthetic gel, titanium dioxide, calcium carbonate, barium sulfate, bentonite, and the like. The preferred supported catalysts include a catalytically active metal content in the range of about 0.1 to 10 percent by weight of the total catalyst, but catalysts having a higher active metal content can be used if desired.

The invention will be further illustrated by reference to the following specific examples:

EXAMPLE I

A large number of catalysts was prepared containing ruthenium and a platinum, palladium or rhodium promoter. The catalytically active metal was supported on a powdered carbon carrier. A preferred method for the preparation of these catalysts is as follows, which exemplifies the preparation of a catalyst consisting of 3.5 percent by weight of elemental ruthenium and 1.5 percent by weight of elemental platinum, supported on carbon powder:

Two precious metal solutions were prepared, one of which consisted of 60 ml. of potassium platinochloride ($K_2PtCl_4$). This solution contained 1 percent by weight of platinum, equivalent to 0.6 gram of platinum. A second solution was prepared by dissolving a quantity of ruthenium trichloride ($RuCl_3$), equivalent to 20.0 grams of elemental ruthenium, in 120 ml. of a 10 percent solution of hydrochloric acid without heating, and then diluting the solution with water to a quantity of 2 liters, the resulting solution being a 1 percent by weight solution of ruthenium, equivalent to 1.4 grams of elemental ruthenium. 38 grams of powdered charcoal (the latter being prepared from pine wood stumps, carbonized, and activated with air at high temperature) were suspended in 200 ml. of water in a 600 ml. beaker, and stirred for a period of 0.5 hour. The solution of potassium platinochloride and 140 ml. of the solution of ruthenium chloride were then added simultaneously, after which a 10 percent solution of sodium carbonate was added dropwise at the rate of 15 ml. at 2 drops per second, and an additional 15 ml. at 0.5 drop per second. The pH of the mixture was then read on a Beckmann potentiometer as 4.80, and an additional 4 ml. of 10 percent sodium carbonate were added, raising the pH to 5.75. Superior catalysts are obtained if the pH is adjusted to the range of about 5.5 to 6.0 before heating.

The suspension was then heated above 90° C. for one hour while stirring, after which the suspension was cooled and permitted to settle. A portion of the filtered supernatant liquid had a pH of 5.35 and an $SnCl_2$ test for platinum corresponded to 3.2 percent by weight of the original quantity of platinum remaining in the filtrate. The solids were separated from the filtrate, washed, and dried at a temperature of 90° C. for a period of about 12 hours. The filtrate was clear and colorless.

The dried precipitate was broken up and a portion thereof was reduced in a hydrogen gas stream at a temperature of 400° C. for a period of 20 minutes, with nitrogen purging.

This catalyst, and others prepared in an analogous manner, were tested for activity in the hydrogenation of acetone to isopropyl alcohol at room temperature. In each of these tests, 50 mg. of a catalyst were placed in a one-liter, heavy-wall Erlenmeyer flask, and 100 ml. of distilled water were added. The flask was placed in a shaker, capped and repeatedly evacuated and filled with hydrogen gas, using the gas burette and leveling bulb method to measure hydrogen uptake. The catalyst was then pre-hydrogenated for a period of 15 minutes by shaking it at the rate of 260 strokes per minute and a stroke amplitude of 2.5 inches. The flask was again evacuated and then filled with air and opened. One ml. of acetone was then added, and the flask was again evacuated and filled with hydrogen. The shaker was started and the hydrogen reacted was measured on the gas burette at various intervals of time. Usually, there was a short period before reaction was initiated so that the most rapid rate of reaction occurred between 5 and 10 minutes after the start of the reaction.

In the table below are listed the results obtained, using various catalysts and following the procedure described above. All of the catalysts were supported on powdered carbon having a particle size below 50 microns. All of the results are the maximum milliliters of hydrogen reacted in a period of 5 minutes.

Table A

| Catalyst No. | Percent of Ru and promoter | Mls. of $H_2$ |
| --- | --- | --- |
| 1 | 5% Ru | 60 |
| 2 | 4% Ru 1% Pd | 110 |
| 3 | 2% Ru 3% Pd | 51 |
| 4 | 1% Ru 4% Pd | 38 |
| 5 | 5% Pd | 0 |
| 6 | 4.5% Ru 0.5% Pt | 116 |
| 7 | 4% Ru 1% Pt | 129 |
| 8 | 4% Ru 0.5% Pt 0.5% Pd | 123 |
| 9 | 3.5% Ru 1.5% Pt | 134 |
| 10 | 3.5% Ru 1% Pt 0.5% Pd | 133 |
| 11 | 2% Ru 3% Pt | 96 |
| 12 | 3.5% Ru 1.5% Rh | 99 |
| 13 | 5% Rh | 17 |

On the basis of these results, it will be noted that the initial activity of the catalyst consisting of 5 percent by weight of elemental ruthenium, supported on carbon, is strongly modified by the substitution of platinum, rhodium or palladium for a portion of the elemental ruthenium. The promotion of the ruthenium metal with one of these other platinum group metals may increase the activity of the catalyst to as much as twice that of the elemental ruthenium catalyst alone.

The ruthenium-platinum and ruthenium-palladium catalysts were also found to be much superior to the elemental ruthenium catalyst in stability of activity. For example, catalyst No. 1 above, when tested three days after the run was made in which a hydrogen uptake of 60 ml. in 5 minutes was observed, reacted with only 5 ml. of hydrogen. However, after being reduced again, the activity of the catalyst was restored so that 62 ml. of hydrogen were taken up when the run was repeated. In other cases, however, elemental ruthenium catalysts which had shown loss of activity upon standing, were unrestored by being again reduced.

In contrast to this, catalyst No. 10 above was retested several years later without being reduced prior to test. The original activity of the catalyst was decreased from 133 ml. of hydrogen taken up, to about 56 ml. of hydrogen taken up so that the catalyst still retained an activity nearly equivalent to that of the fresh elemental ruthenium catalyst.

EXAMPLE II

Other materials than carbon were tested for use as catalyst supports and among these were titanium dioxide having a particle size in the range of about 7 to 20 microns, titanium dioxide having a sub-micron particle size, kieselguhr, barium sulfate, calcium carbonate and activated alumina.

Preparation of catalysts using the aforementioned supports was effected using methods analogous to that described for the preparation of the catalyst of Example I. However, there was a slight variation in the preferred conditions for the reduction of the precipitated mixed hydrates of ruthenium and promoter metals, depending upon the carrier employed.

In the case of a calcium carbonate carrier, and other carriers attacked by the acidity of the ruthenium chloride, a modification of the coating procedure is desirable. A preferred procedure using such carriers is as follows:

38 grams of calcium carbonate were suspended in 200 ml. of water in a 600 ml. beaker while stirring, and 80 ml. of potassium platinochloride solution, containing 0.8 gram of platinum and having a pH of about 4, were added at once to the suspension. Some bubble formation occurred after this addition; the pH of the suspension was then 7.1. 120 ml. of a solution of ruthenium chloride, prepared in accordance with the procedure disclosed in Example I above and containing 1.2 grams of ruthenium, was added dropwise while bubble formation occurred as a result of the reaction of calcium carbonate releasing carbon dioxide. After the ruthenium chloride solution was completely added, the pH was 5.58 so that no pH adjustment was required before heating. The suspension was then heated to a temperature of 90° C. for a period of two hours while stirring, and it was then allowed to settle. A portion of the filtered supernatant liquid had a pH of 7.3, and a platinum test corresponding to 12 percent by weight of the original quantity of platinum undeposited. The precipitate was washed and dried at a temperature of 90° C. for several days. The filtrate was faintly colored. The dry solids were broken up and one portion thereof was reduced at a temperature of 230° C. with hydrogen for a period of 20 minutes while purging with nitrogen.

A second portion of the solids was further dried overnight at a temperature of 175° C., and 10 grams thereof were suspended while stirring in 150 ml. of water in a 250 ml. beaker. To this suspension was added 1.0 ml. of 88 percent formic acid, and the suspension was heated at a temperature of 90° C. for a period of one hour and was then permitted to cool and settle. A portion of the filtered supernatant liquid had a pH of about 6, and a platinum test indicated about 3.5 percent by weight of the original quantity of platinum redissolved. The precipitate was washed and dried at a temperature of about 90° C. The filtrate had a deep yellow color, indicating that some ruthenium also was redissolved.

The first portion of the solids, as described above, is catalyst No. 1 in the table below, while the second portion is catalyst No. 2 in the table below. Activity tests of these catalysts were compared, together with catalysts having different supports but prepared in an analogous fashion. In each case, a 2.5 mg. total of catalytically active metal was employed, e.g. 50 mg. of catalyst containing 5 percent by weight of catalytically active metal, or 250 mg. of catalyst containig 1 percent by weight of catalytically active metal.

Following the procedure described in Example I above, 1 ml. of acetone was hydrogenated in the presence of 100 ml. of water in each case. In the results below, hydrogen rates are listed for the most active preparation made of each catalyst type.

Table B

| Catalyst No. | Percent of Ru and promoter | Carrier | Mls. of $H_2$ |
|---|---|---|---|
| 1 | 3% Ru 2% Pt | $CaCO_3$ | 71 |
| 2 | 3% Ru 2% Pt | $CaCO_3$ | 67 |
| 3 | 3.5% Ru 1% Pt 0.5% Pd | $CaCO_3$ | 64 |
| 4 | 4% Ru 1% Pd | $CaCO_3$ | 63 |
| 5 | 5% Ru | $CaCO_3$ | 36 |
| 6 | 1.2% Ru 0.8% Pd | $CaCO_3$ | 88 |
| 7 | 0.7% Ru 0.3% Pt | $CaCO_3$ | 113 |
| 8 | 4% Ru 1% Pd | $TiO_2$(TG) | 18 |
| 9 | 1.6% Ru 0.4% Pd | $TiO_2$(TG) | 28 |
| 10 | 0.4% Ru 0.1% Pd | $TiO_2$(TG) | 73 |
| 11 | 0.08% Ru 0.02% Pd | $TiO_2$(TG) | 111 |
| 12 | 4% Ru 1% Pd | $TiO_2$(AMO) | 65 |
| 13 | 4% Ru 1% Pd | Kieselguhr | 75 |
| 14 | 4% Ru 1% Pd | $BaSO_4$ | 23 |
| 15 | 3.5% Ru 1.5% Pt | Alumina | 30 |
| 16 | 3.5% Ru 1.5% Pt | Same, except base digested HCl. | 56 |

The foregoing results show that low surface carriers, such as titanium dioxide (technical grade) and calcium carbonate have greatly increased activity per unit weight of precious metal when the percentage of metal in the catalyst is decreased below 5 percent by weight because of wider dispersion of the metal. This does not occur when using high surface carriers, such as carbon, for example, upon reduction of the metal content below 5 percent by weight. If the activity of the catalyst is compared on the basis of volume rather than weight, the titanium dioxide TG carrier which has density 5 or 6 times that of the powdered carbon used, compares more favorably with the same weight of metal on the same volume of carbon.

EXAMPLE III

Preferred methods of mixing carriers with metal salts, and the hydrolysis thereof, are described in the preceding examples. Reduction of the catalyst powders was examined in hydrogen gas streams at various temperatures, also by heating of wet suspension with formic acid or alkaline formate solutions, and by combinations of wet and dry reductions.

Generally speaking, wet reductions were ineffective for the treatment of elemental ruthenium catalysts, but had some effect upon metal combinations. The dry reduction preparations were generally more active, however. In a few cases, wet followed by dry reduction gave the most active catalysts with metal combinations, but such results were not consistently achieved. In certain cases of reduction of catalysts in hydrogen gas streams, a pre-heating of the catalysts to the reduction temperature in a nitrogen gas stream resulted in more active catalysts.

An impressive fact about the reduction of ruthenium or ruthenium and metal promoters, using hydrogen gas, is that the preferred reduction temperature is specific for each carrier, this not being easily explained although sintering effects are probably a factor. The preferred reduction temperature may be as low as 75 or as high as 550° C.

The preferred reduction temperatures are the highest using carbon carriers, including activated carbon powder from pine wood stumps, these temperatures generally being in the range of 500 to 550° C. for a catalyst consisting of 5 percent by weight elemental ruthenium on carbon, and about 450° C. for elemental ruthenium in combination with a promoter metal. For other carbon carriers, the preferred reduction temperature may be as low as about 200° C. Catalysts using alumina and titanium dioxide are most active when reduced at a temperature of about 250° C., while those using calcium carbonate, barium sulfate and silica gel as carriers are most active when reduced at a temperature of about 200° C. Catalysts using kieselguhr as a carrier were most active when reduced at a temperature in the range of 75 to 125° C.

EXAMPLE IV

Reference has been made to the loss in activity of 5 percent elemental ruthenium on carbon catalysts upon standing in air or in a closed container. This loss in activity may be due to local oxidation effects since the activity of these catalysts after short periods of standing was variable, while after long periods of standing, these catalysts were uniformly completely deactivated. However, to varying degrees, they could be regenerated by again treating them with a reducing gas. The loss in activity is general for all carbonyl hydrogenations attempted, as will be noted in Example V below.

Another elemental ruthenium catalyst which shows serious loss in activity upon standing is that consisting of elemental ruthenium supported on kieselguhr as a carrier. However, when certain carriers are used, elemental ruthenium catalysts become more active upon standing.

Catalysts containing ruthenium and promoter metals, supported on carbon, decrease in activity only moderately upon standing. When those carriers are employed upon which elemental ruthenium catalysts become more activated upon standing, promoted ruthenium catalysts usually are also activated upon standing, but apparently to a lesser degree.

These effects are tabulated in the table below. In certain cases, 100 mg. of catalyst were used so that the results are not directly comparable with the 50 mg. tests previously mentioned. All the tests were made with 1 ml. of acetone and 1 ml. of water, using the procedure described above. When two figures are shown, they refer to duplicate tests.

Table C

| Percent of Ru and promoter | Carrier | Mgs. catalyst | Days aged at R.T. | Ml. of $H_2$ | |
|---|---|---|---|---|---|
| | | | | Freshly reduced | After aging |
| 5% Ru | Norit "Superior Neutral" Carbon | 100 | 210 | 95 | 0 |
| 5% Ru | Kieselguhr | 100 | 105 | 98 | 7 |
| 5% Ru | Silica gel | 100 | 120 | 87 | 0 |
| 5% Ru | $BaSO_4$ | 100 | 230 | 34 | 74, 78 |
| 5% Ru | $CaCO_3$ | 100 | 180 | 38 | 107, 106 |
| 5% Ru | $TiO_2$(AMO) | 100 | 125 | 92 | 106, 111 |
| 4% Ru 1% Pd | Norit "Superior Neutral" Carbon | 100 | 200 | 154, 121 | 146 |
| 4% Ru 1% Pt | do | 50 | 60 | 133 | 104 |
| 4% Ru 1% Pd | Kieselguhr | 100 | 190 | 111, 68 | 90 |
| 4% Ru 1% Pd | $BaSO_4$ | 50 | 16 | 16 | 23, 19 |
| 4% Ru 1% Pd | $CaCO_3$ | 50 | 110 | 39 | 50 |
| 4% Ru 1% Pd | $TiO_2$(AMO) | 100 | 190 | 41, 64 | 75 |

Attempts were made to accelerate aging effects on catalysts containing ruthenium and promoter metals by contact with heated air. Catalysts supported on carbon showed little effect from the treatment, but those supported on barium sulfate and calcium carbonate showed an increased activity.

A catalyst consisting of 4 percent by weight ruthenium and 1 percent by weight palladium, supported on calcium carbonate, was maintained at room temperature for a period of 16 days and then a part thereof was heated at a temperature of 75° C. for a period of 16 hours. A second catalyst consisting of 4 percent by weight ruthenium and 1 percent by weight of palladium, supported on barium sulfate, was treated similarly. 50 mg. of each catalyst was used in the hydrogenation test described above. The results are as follows:

Table D

| Catalyst | Maximum Ml. of H₂ in 5 minutes | | |
|---|---|---|---|
| | Freshly reduced | Aged 16 days at R.T. | Heated 16 hrs. at 75° C. |
| 1 | 39 | 50, 46 | 70, 59 |
| 2 | 16 | 23, 19 | 32 |

EXAMPLE V

In the table below is compared the activity of various catalysts containing ruthenium or ruthenium and promoters in the hydrogenation of various carbonyl compounds. Room temperature reactions with acetone, methyl ethyl ketone, cyclohexanone, n-heptaldehyde, levulose and dextrose are shown.

Table E
CATALYSTS CONTAINING RUTHENIUM: HYDROGENATION OF VARIOUS CARBONYL COMPOUNDS

[ All tests with room temperature shaking and 100 ml. of distilled water. Catalysts in amounts shown prehydrogenated 15 minutes before addition of hydrogenates, except No. 12 has 10 times these amounts for equivalent metal content]

| Catalyst No. | Percent of metal | | | Carrier | Maximum Ml. of H₂ in five minutes with— | | | | | |
|---|---|---|---|---|---|---|---|---|---|---|
| | Ru | Pt | Pd | | Acetone, 1 ml.; 50 mg. catalyst | M. E. K., 1 ml.; 50 mg. catalyst | Cyclohexanone, 2 ml.; 50 mg. catalyst | N-heptaldehyde, 1 ml.; 100 mg. catalyst | Levulose, 2 gms.; 100 mg. catalyst | Dextrose, 200 mg.; 2 gms. catalyst |
| 1 | 5 | | | Norit "Superior Neutral" carbon (reduced freshly). | 55 (lag) | 42 | 0 (15 m.) | 3 (lag) | 13 (lag) | |
| 2 | 5 | | | Norit "Superior Neutral" carbon, aged one month. | | 1 (lag) | | 2 (lag) | 0 (22 m.) | |
| 3 | 4 | | 1 | Norit "Superior Neutral" carbon | 90, 77 | 82 | 29 | 10 | 7 | 6 |
| 4 | 3.5 | 1.5 | | do | 134 | 113 | 33 | 8 | 11 | |
| 5 | 2 | | 3 | do | 78 | 71 | 25 | 3.5 | 5.5 | |
| 6 | 1 | | 4 | do | 61 | 65 | 23 | 10 | 4.5 | |
| 7 | 3 | 2 | | CaCO₃ (ppt., USP, Merck) | 49 (lag) | | 25 (lag) | 6 (lag) | 4 (lag) | |
| 8 | 3 | 2 | | do | 71 | | 43 | 9 | 19 | |
| 9 | 3.5 | 1 | 0.5 | do | 46 | | 50 | 15 | 17 | |
| 10 | 4 | | 1 | do | 54 | 60 | 50, 51 | 8 | 17, 21 | |
| 11 | 4 | | 1 | Kieselguhr (Dicalite SA-3) | 44 (lag) | | 30 | 16 | 5 | |
| 12 | 0.35 | 0.1 | 0.05 | TiO₂ (TG) | 75, 92 | | 28 | 10 | 13 | |
| 13 | 5 | | | TiO₂ (AMO) | 39 (lag) | | 11 (lag) | 7 (lag) | 6 (lag) | |
| 14 | 5 | | | BaSO₄ | 35 (lag) | | 0 (15 m.) | 1 (lag) | 8 (lag) | |

Note 1.—The expression "lag" in the above table indicates delay in the catalysts becoming active. The expression "0 (22 m.)" indicates no activity developed after shaking with the hydrogenate for 22 minutes.
Note 2.—The abbreviation "M. E. K." stands for "methyl ethyl ketone."
Note 3.—Catalysts Nos. 7 and 8 are parts of the same impregnation; No. 7 was reduced by formic acid and No. 8 by hydrogen gas at 200° C.

In the foregoing table, it will be noted that:
(1) Under room temperature conditions, ketone hydrogenations are effected more readily than aldehyde hydrogenations, i.e. cyclohexanone more than n-heptaldehyde and levulose more than dextrose.
(2) Whereas catalysts using carbon supports are most active for hydrogenating acetone and methyl ethyl ketone, those supported on calcium carbonate are preferred for the hydrogenation of cyclohexanone, n-heptaldehyde and levulose.
(3) The lack of stability of catalysts containing only elemental ruthenium as a catalytically active metal as compared to ruthenium metal and a promoter metal, all supported on carbon, is shown for all of these hydrogenation reactions.
(4) The superiority of the dry hydrogen reduction of the catalyst supported on calcium carbonate over the wet reduction thereof, is also shown.
(5) The commercially important hydrogenation reaction of dextrose to sorbitol shows a very slight activity under these conditions.

EXAMPLE VI

In the hydrogenation of aromatics at atmospheric pressure and at room temperature, supported rhodium catalysts have been found to be superior. At temperatures in the range of 150 to 260° C. with a one atmosphere gas phase flow system and granular catalysts, platinum, on either carbon or alumina, is superior to rhodium for the hydrogenation of toluene using the same carriers. Palladium on alumina has been found to be superior to rhodium on alumina and, under the same conditions, ruthenium catalysts were found to be much inferior to those of platinum, palladium or rhodium, and approximately equivalent to nickel catalysts.

The active platinum catalysts, however, were found to be very susceptible to poisoning by the thiophenes which are present in reagent grade toluene. It was discovered that substitution of ruthenium for about two-thirds of the platinum, produced catalysts, both on extruded alumina and granular carbon supports, which resisted poisoning to a greater degree.

Comparison toluene hydrogenations were effected in a Pyrex reactor, using 18.4 grams of catalyst in a bed 2.5 inches deep. The initial temperature was maintained at 200° C. by an agitated oil bath. A mixture consisting of 9 moles of hydrogen and 1 mole of toluene was passed over the catalyst at a pressure of 1 atmosphere and a weight hourly space velocity of 2.

About 40 ml. of reagent grade toluene was passed over the catalyst in slightly less than one hour. The product was collected in a solid carbon dioxide and methanol trap and assayed for percent methylcyclohexane-percent toluene against standards by means of refractive index. After purging the catalyst and exposing it to air, it was replaced in the reactor and used in a run of 4.5 hours under the same conditions using a more impure toluene, the same lot being used for each comparative run. Samples were collected for refractive index measurement during the beginning, middle and last half hour of the 4.5 hour period, i.e. based on the total test, 1 to 1.5 hours; 3 to 3.5 hours; and 5 to 5.5 hours.

Percent conversion to methylcyclohexane is shown for each of the four test samples of specified catalysts. The carbon carrier used was cocoanut carbon having a particle size in the range of 4 to 8 mesh. The activated alumina used was 1/16 inch extrudate. The metals were deposited on the exterior surface of the granular carbon, while in the case of alumina, they were deposited by gel impregnation prior to the formation of pellets.

The results are as follows:

Table F

| Catalyst composition | Percent conversion to methylcyclohexane | | | |
|---|---|---|---|---|
| | 0 to 1 hr. | 1 to 1.5 hrs. | 3 to 3.5 hrs. | 5 to 5.5 hrs. |
| 0.6% Pt on C | 76 | 65 | 1 | 0 |
| 0.4% Ru; 0.2% Pt on C | 68 | 58 | 25 | 0 |
| 0.6% Pt on alumina | 74 | 44 | 7 | 0 |
| 0.4% Ru; 0.2% Pt on alumina | 59 | 55 | 30 | 15 |

It is apparent from the table that substitution of ruthenium for two-thirds of the normal platinum content increased the active life of the catalyst in this reaction.

Catalysts, prepared in accordance with this invention, which contain a relatively low proportion of ruthenium in relation to the promoter metal and which are efficacious for the reduction of certain sugars, are disclosed in co-pending application Serial No. 702,271, filed December 12, 1957, now abandoned.

It will be obvious to those skilled in the art that many modifications may be made within the scope of the present invention without departing from the spirit thereof, and the invention includes all such modifications.

What is claimed is:

1. A supported ruthenium-containing catalyst comprising a solid catalyst support and deposited thereon ruthenium, and as a promoter, a material selected from the group consisting of platinum, rhodium and palladium, the ruthenium content of the catalyst being at least about 20 percent by weight of the catalytically active metal content of the catalyst.

2. A catalyst according to claim 1 in which the ruthenium content of the catalyst is selected from the group consisting of elemental ruthenium and ruthenium oxide.

3. A catalyst according to claim 1 in which the ruthenium content of the catalyst is between about 20 and 95 percent by weight of the catalytically active metal content of the catalyst.

4. A catalyst according to claim 1 in which the support is carbon.

5. A supported ruthenium-containing catalyst comprising a solid catalyst support and deposited thereon ruthenium and, as promoter, a material selected from the group consisting of platinum, rhodium, and palladium, the ruthenium content of the catalyst being selected from the group consisting of elemental ruthenium and ruthenium oxide, and the ruthenium content of the catalyst being between about 20 and 95 percent by weight of the catalytically active metal content of the catalyst.

6. A method of making a catalyst, which comprises suspending a powdered solid catalyst support in water, adding a solution of a salt of ruthenium and a solution of a salt of another platinum group metal of the group consisting of platinum, rhodium and palladium to the suspension, the ruthenium salt being added in amount sufficient to provide a ruthenium content in the product catalyst, after reduction by treatment with a reducing gas, of at least about 20 weight percent of the catalytically active metal content of the catalyst, hydrolyzing the salts, heating and agitating the mixture, separating the solids from the aqueous phase, drying the solids and subjecting the solids to treatment with a reducing gas.

7. A method according to claim 6 in which the salt of ruthenium is ruthenium chloride and the salt of the other platinum group metal is potassium platinochloride.

8. A method according to claim 6 in which the salt of ruthenium is ruthenium chloride and the salt of the other platinum group metal is sodium palladium chloride.

9. A method according to claim 6 in which the salt of ruthenium is ruthenium chloride and the salt of the other platinum group metal is rhodium chloride.

10. A method according to claim 6 in which the solid support is calcium carbonate and the ruthenium chloride solution is added dropwise to the suspended support.

11. A method of increasing the activity of a supported ruthenium-containing catalyst in which the support is selected from the group consisting of barium sulfate, calcium carbonate and titanium dioxide, which comprises aging the catalyst having a ruthenium content of at least about 20 percent by weight of the catalytically active metal content of the catalyst for a period of at least 16 days at a temperature of from room temperature to 75° C., thereby increasing the activity of the catalyst.

12. The method of claim 1 wherein the aging period is from 16 days to 230 days.

13. The method of claim 11 wherein the aging is carried out at room temperature.

14. An aged supported ruthenium-containing catalyst of materially increased activity and in which the support is selected from the group consisting of barium sulfate, calcium carbonate and titanium dioxide, and the ruthenium content of the catalyst is at least about 20 percent by weight of the catalytically active metal content of the catalyst, said catalyst being prepared by the method of claim 11.

References Cited in the file of this patent

UNITED STATES PATENTS

| | | |
|---|---|---|
| 2,475,155 | Rosenblatt | July 5, 1949 |
| 2,478,261 | Frank | Aug. 9, 1949 |
| 2,607,807 | Ford | Aug. 19, 1952 |
| 2,692,224 | Heinemann | Oct. 19, 1954 |
| 2,747,970 | Rosenblatt | May 29, 1956 |
| 2,798,051 | Bicek | July 2, 1957 |
| 2,868,847 | Boyers | Jan. 13, 1959 |